(12) United States Patent
Bottacini

(10) Patent No.: US 10,174,820 B2
(45) Date of Patent: Jan. 8, 2019

(54) ACTUATING DEVICE OF THE ARTICULATED LEVER OR CAM TYPE FOR THE PRECISE POSITIONING OF A PIVOTABLE ARM

(71) Applicant: PNEUMAX S.p.A., Milan (IT)

(72) Inventor: Roberto Bottacini, Lurano (IT)

(73) Assignee: PNEUMAX S.P.A., Milan (IT)

( * ) Notice: Subject to any disclaimer, the term of this patent is extended or adjusted under 35 U.S.C. 154(b) by 388 days.

(21) Appl. No.: 15/088,719

(22) Filed: Apr. 1, 2016

(65) Prior Publication Data

US 2016/0298739 A1 Oct. 13, 2016

(30) Foreign Application Priority Data

Apr. 9, 2015 (WO) ................ PCT/EP2015/057783

(51) Int. Cl.
*F16H 21/44* (2006.01)
*F16H 25/18* (2006.01)
*B25B 5/06* (2006.01)
*B25B 5/12* (2006.01)
*B25B 5/16* (2006.01)

(52) U.S. Cl.
CPC ............ *F16H 21/44* (2013.01); *B25B 5/064* (2013.01); *B25B 5/122* (2013.01); *B25B 5/16* (2013.01); *F16H 25/18* (2013.01)

(58) Field of Classification Search
None
See application file for complete search history.

(56) References Cited

U.S. PATENT DOCUMENTS 4,113,070 A * 9/1978 Paginton ............... B60T 17/081
  188/196 F
4,700,936 A * 10/1987 Lunn ........................ B25B 1/18
  269/226

* cited by examiner

*Primary Examiner* — Joseph J Hail
*Assistant Examiner* — Brian D Keller
(74) *Attorney, Agent, or Firm* — Florek & Endres PLLC

(57) ABSTRACT

An actuating device of the articulated lever or cam type having a body coupled to a sliding control piston, the piston coupled to an actuator movable along a piston axis and operatively coupled to a pivotable arm to pivot it about a first rotational axis upon a sliding movement of the actuator. The actuator has two relatively displaceable parts and one or more rotary elements having at least one mechanical coupling that acts on the first part of the actuator to transform a rotary control movement imparted on the at least one mechanical coupling about a second rotational axis transverse to the piston axis, into a relative displacement between the first part and the second part of the actuator along the piston axis to modify the length of the actuator.

15 Claims, 5 Drawing Sheets

FIG. 1

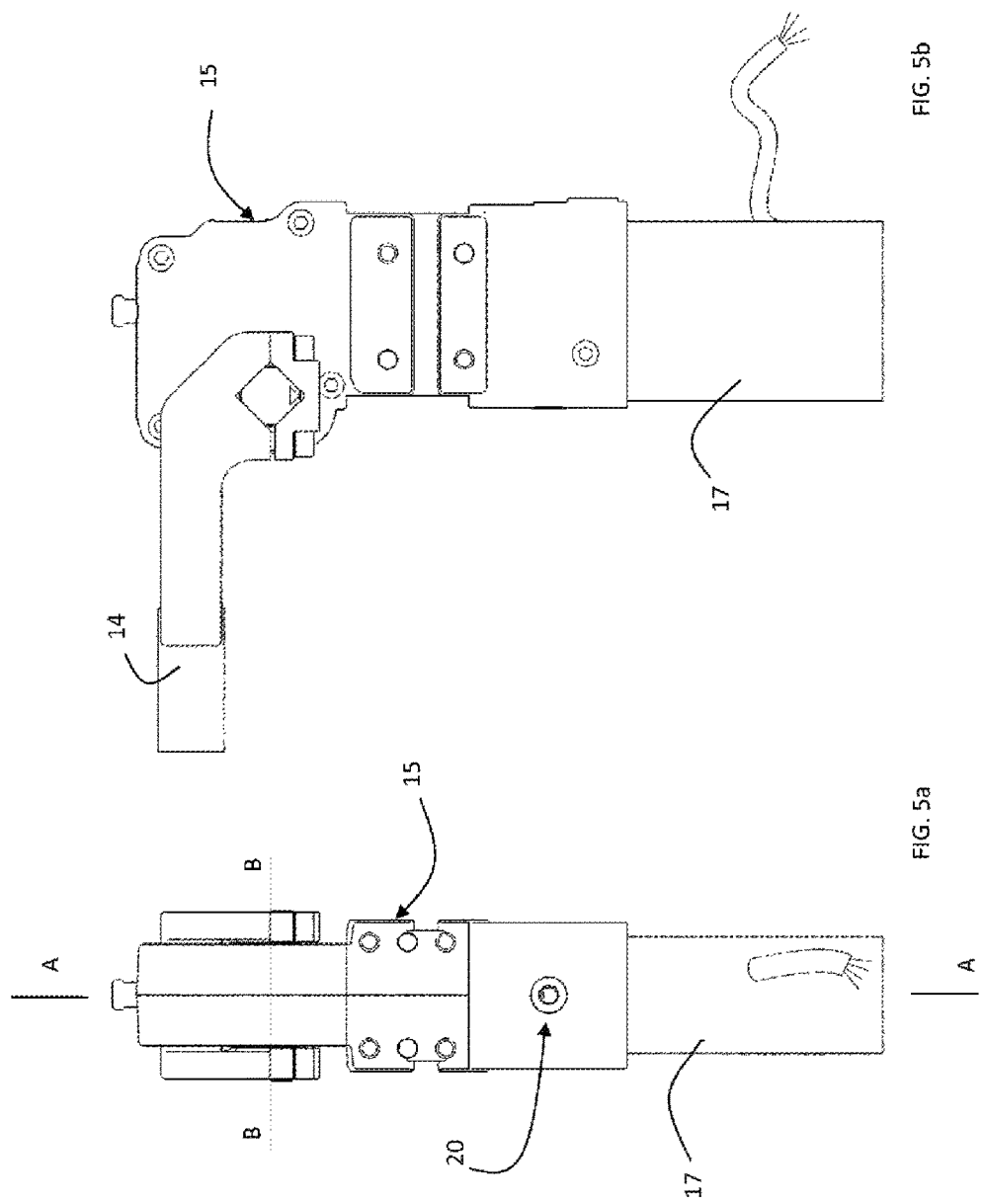

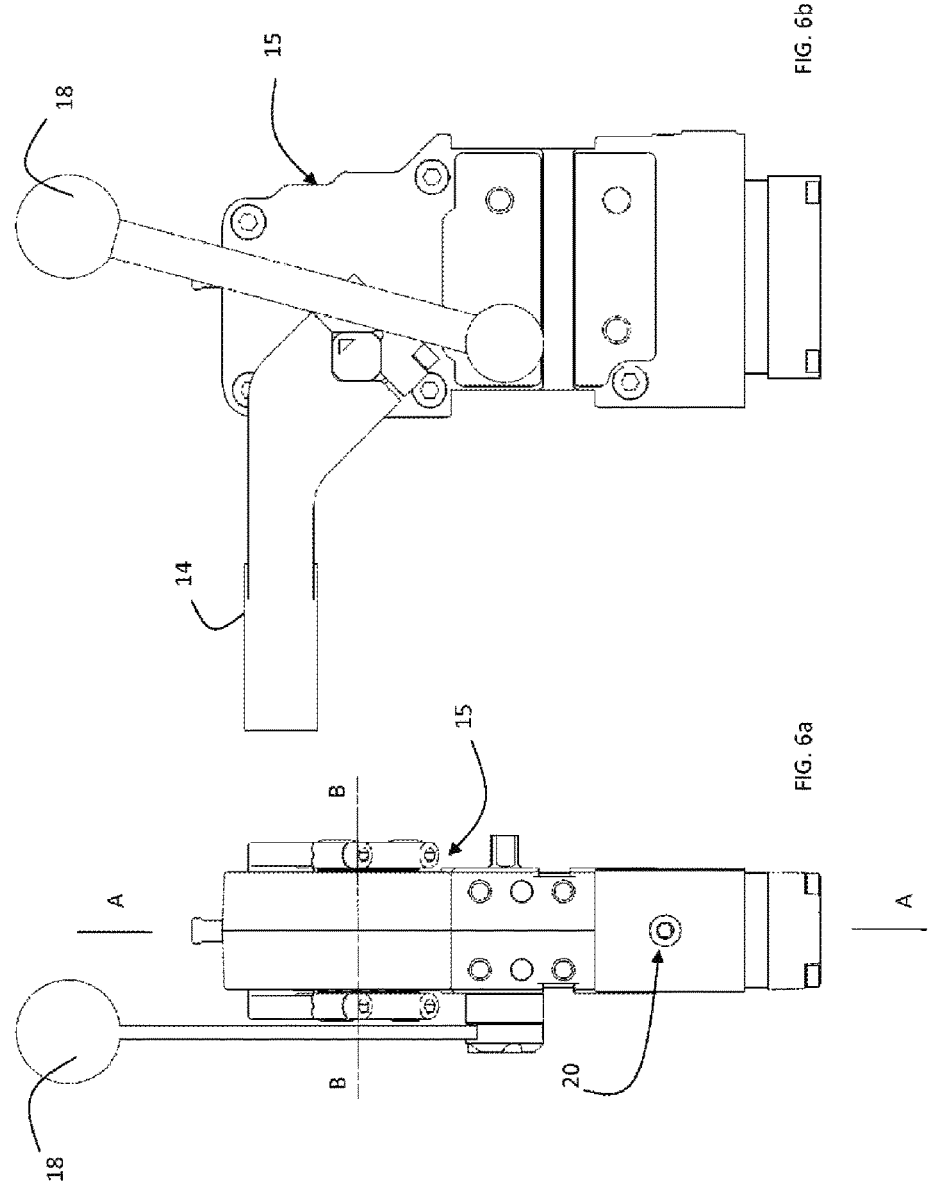

ACTUATING DEVICE OF THE ARTICULATED LEVER OR CAM TYPE FOR THE PRECISE POSITIONING OF A PIVOTABLE ARM

BACKGROUND TO THE INVENTION

The present invention relates to an actuating device of the articulated lever or cam type for the precise positioning of a pivotable arm. In particular, the present invention relates to an actuating device of the articulated lever or cam type typically used for handling elements during metalworking processes, e.g. in welding lines of the vehicle body construction industry.

Metalworking processes require a very precise positioning of the elements to be worked and that the positioning is kept during time. Furthermore, repeatability of the exact positioning must be assured at each working cycle. In order to achieve a very precise, constant and repeatable positioning, the actuating devices nowadays used in the vehicle body construction industry typically comprise a sliding control piston which is alternatively operated by an actuator or manually. The control piston is operatively connected to a pivotable arm through interposition of an articulated lever or a cam mechanism in order to induce a pivoting movement of the pivotable arm triggered by the sliding movement of the piston. The displacement triggered by the piston moves the pivotable arm from a non-operating angular position to an operating angular position. The non-operating angular position can be set through an initial adjustment of the stroke of the piston.

Throughout the present description and in the appended claims the expression "lateral side of the device" refers to any side parallel to the extension of the piston, namely the piston axis, and "bottom and top side of the device" refer to the sides perpendicular to the piston axis.

RELATED ART

In order to set the non-operating position of the pivotable arm, the actuating devices usually comprise adjusting means which act on the piston in order to set its stroke length. Nowadays, the adjusting means are typically positioned at the bottom face of the device, which is usually not easily accessible when the actuating device is mounted in use. For example, document EP 1 262 285 describes a known adjusting means which comprises a threaded piston cooperating with an internally threaded rod.

Other known adjustment solutions, allow to directly act on the piston e.g. by means of an Allen key connected to the piston through the interposition of a hexagonal insert. Such kind of adjusting means are known e.g. from DE 202 03 790 and EP 0967 050. However, also in this case, the adjusting means are positioned at the bottom face of the device.

Different known solutions of adjusting means for actuating device of the above kind are accessible from the side or lateral face of the device. A first example is described in document EP 1 524 081. This solution comprises a coaxial sleeve which is slidably mounted outside a rod and is provided with fastening means adapted to fasten the sleeve selectively in a plurality of positions axially spaced along the rod. The relative positioning between sleeve and rod defines the stroke of the rod and therefore the rotary movement of the pivotable arm. Particularly, the fastening means for fastening the sleeve to the rod are accessible from a lateral side of the actuating device. Thus, the adjustment of the operating position of the pivotable arm can be easily achieved.

Applicant realized that the axial positions along the rod, at which the sleeve can be fastened are defined by means of a plurality of through holes formed on the rod and spaced apart from each other of a constant pitch. For example the constant pitch of the seats on the rod corresponds to a rotation of 10° of the pivotable arm. In this way, however, only a discrete adjustment of the operating position of the pivotable arm can be achieved.

A further example of easily accessible adjustment means for the adjustment of the operating position of the pivotable arm of an actuating device of the kind of the present invention is described in document DE 10 2012 1030 921. The device described in DE 10 2012 1030 921 comprises a piston made in two parts (rod and sleeve) which can slide one with respect to the other in order to set a relative position between the two parts and thereby the angular operating position of the pivotable arm. Once the desired relative position is reached, the sliding of the two parts is blocked by means of a headless screw which acts on a fastening element comprised in the sleeve, by pressing it against the rod. The headless screw is accessible from a lateral side of the actuating device so that the adjustment can be easily performed.

Applicant realized that even though the adjusting means described in DE 10 2012 1030 921 are easily accessible, they are not able to assure a long-lasting adjustment since the forces applied by the device are very high and a headless screw is generally not able to reliably withstand such forces for a long time. Thus, the solution described in DE 10 2012 1030 921 does not assure a precise and perfectly repeatable positioning of the pivotable arm, since the adjustment could slightly yield over time.

Document U.S. Pat. No. 4,700,936 describes a clamping device with a movable clamp member actuated by a jack screw driven by an electric motor through a worm meshing with a gear connected to the jack screw. The clamping device of U.S. Pat. No. 4,700,936 does not comprise adjusting means of the stroke of the clamp member and uses the mechanical coupling between the worm and the gear connected to the jack screw for the actuation of the clamp member.

SUMMARY OF THE INVENTION

Accordingly, Applicant considered the problem of obviating the above mentioned drawbacks and, in particular, of providing an actuating device of the articulated lever or cam type which can be easily and continuously adjusted with respect to the angular non-operative position of its pivotable arm and, at the same time, is capable of reliably maintaining the adjusted non-operative position over time.

Accordingly, the present invention relates to an actuating device of the articulated lever or cam type comprising a body coupled to a sliding control piston, the piston being connected to or coupled to actuating means movable along a first piston axis and operatively coupled to a pivotable arm through interposition of an articulated lever or a cam mechanism in order to induce a pivoting movement of the pivotable arm about a first rotational axis perpendicular to the piston axis upon a sliding movement of the actuating means along the piston axis, the pivotable arm being movable between a non-operative angular position and an operative angular position, the actuating means comprising a first and a second part displaceable with respect to one another along the piston axis, and adjusting means for the adjustment of the length of the actuating means characterized in that the adjusting means comprise mechanical coupling means acting on the first part of the actuating means in order to transform a rotary control movement imparted on said coupling means about a second rotary axis transversal to the piston axis, into a relative displacement between the first and the second part of the piston actuating means along the piston axis, thereby modifying the length of the actuating means.

Throughout the present description and in the appended claims the expressions "transversal to the piston axis" refers to any direction non-parallel to the piston axis.

This advantageously allows achieving a stepless adjustment of the stroke of the piston rod and consequently of the angular non-operative position of the pivotable arm connected to the piston through the articulated lever or cam mechanism. In fact, the continuous movement imparted on the coupling means is transformed into a continuous displacement of the two parts of the actuating means along the piston axis, thereby achieving a continuous adjustment of the overall length of the actuating means and therefore of the related stroke.

Moreover, the setting imparted by means of the adjusting means of the actuating device according to the invention is reliable over time since it is a direct consequence of the rotary control movement imparted on the mechanical coupling means. In absence of said control movement, no relative displacement of the two parts forming the actuating means is induced.

Furthermore, the actuating device according to the present invention allows bringing and maintaining the pivotable arm into its operative position even in absence of an actuation force applied to the control piston. In fact, the particular adjusting means used in the actuating device according to the invention, allow the articulated lever linkage to reach the over toggle point. Therefore, in case for example of a pneumatic actuation of the piston, the pivotable arm can be brought into its operative position even in absence of air.

The present invention may have at least one of the following preferred features; the latter may in particular be combined with each other as desired to meet specific implementation purposes.

Preferably, the two parts of the actuating means comprise a piston rod and a linking element slidably coupled to each other, wherein the linking element is connected to the articulated lever or a cam mechanism.

More preferably, the piston rod and the linking element comprise reciprocally coupled threaded surfaces and the rotary control movement imparted on said coupling means about the second rotary axis is transformed into a relative rotation between the piston rod and the linking element.

Even more preferably, the connecting element is a fork linkage.

Preferably, the second rotary axis is perpendicular to the piston axis.

Preferably, the mechanical coupling means comprise at least one first rotary element adapted to rotate about the second rotary axis, which can be brought into engagement on a second rotary element coaxially constrained to the first part of the actuating means, the rotation of the at least one first rotary element about the second rotary axis when engaged on the second rotary element causing a rotation of the second rotary element about the piston axis.

This advantageously determines a rotation of the first part of the actuating means and particularly of the piston rod which determines an axial relative displacement between the two parts of the actuating means, namely the piston rod and the connecting element. The overall length of the actuating means is thereby varied and consequently the piston stroke. This determines a corresponding variation of the angular non-operative position of the pivotable arm.

Furthermore, the fact that the first rotary element engages the second rotary element during adjustment only, leads to a further advantage, namely the rotary elements are substantially not subjected to wear.

Even more preferably, the at least one first rotary element and the second rotary element are toothed elements, preferably toothed crowns or cones.

Alternatively, the at least one first rotary element and the second rotary element are adapted to couple between each other by friction.

Preferably, the mechanical coupling means comprise a plurality of first rotary elements each accessible from a lateral side of the device.

This advantageously allows accessing to the adjusting means from a plurality of sides thereby making the adjustment easy to perform irrespective of the configuration of the device mounted in use.

Preferably, the at least one first rotary element comprises a seat for receiving an adjustment tool and a blocking element which cooperates with a first seat obtained in the body and with the adjustment tool seat in order to hold the first rotary element into an engagement position with the second rotary element when the adjustment tool is inserted into the adjustment tool seat and to retain the adjustment tool into its seat.

More preferably, the blocking element is a first spherical element retained into a hole obtained in the at least one first rotary element which, at a first end, opens out into the adjustment tool seat.

Preferably, the at least one first rotary element is coupled to first elastic means adapted to force the at least one first rotary element into its disengaged position.

Alternatively, the mechanical coupling means comprise an endless screw coupled to the first part of the actuating means so that a rotation of the endless screw determines a displacement of the first part of the actuating means with respect to the second part of the actuating means, wherein the axis of the endless screw is the second rotary axis.

Preferably, the piston rod comprises at least one stopping element which cooperates with a corresponding second seat obtained in the piston in order to substantially maintain the angular position of the piston rod against a rotation about the piston axis.

More preferably, the at least one stopping element is a second spherical element cooperating with second elastic means forcing the second spherical element into a corresponding seat obtained in the piston.

Even more preferably, the second elastic means is a spring.

This advantageously allows maintaining the adjustment once set by preventing a relative rotation between the piston and the piston rod. The adjustment is therefore reliable over time.

Preferably, the piston is pneumatically actuated by means of a cylinder, preferably a double effect cylinder.

Alternatively, the piston is actuated by means of an electrical actuator.

According to a further embodiment, the second part of the piston actuating means is connected to a manual actuation element for manually operating the articulated lever or a cam mechanism.

Preferably, the articulated lever mechanism is a toggle lever mechanism.

More preferably, the articulated lever mechanism comprises a crank lever.

Preferably, the actuating device is a clamping unit or power clamp.

Alternatively, the actuating device is a pivot unit or power pivot.

BRIEF DESCRIPTION OF THE FIGURES

With reference to the attached drawings, further features and advantages of the present invention will be shown by means of the following detailed description of some of its preferred embodiments. According to the above description, the several features of each embodiment can be unrestrictedly and independently combined with each other in order to achieve the advantages specifically deriving from a certain combination of the same.

In the said drawings,

FIGS. 5a and 5b are side views of a second embodiment of the actuating device according to the present invention with the pivotal arm in its operative position;

FIGS. 6a and 6b are side views of a third embodiment of the actuating device according to the present invention with the pivotal arm in its operative position.

DETAILED DESCRIPTION OF CURRENTLY PREFERRED EMBODIMENTS OF THE INVENTION

Figure 1:
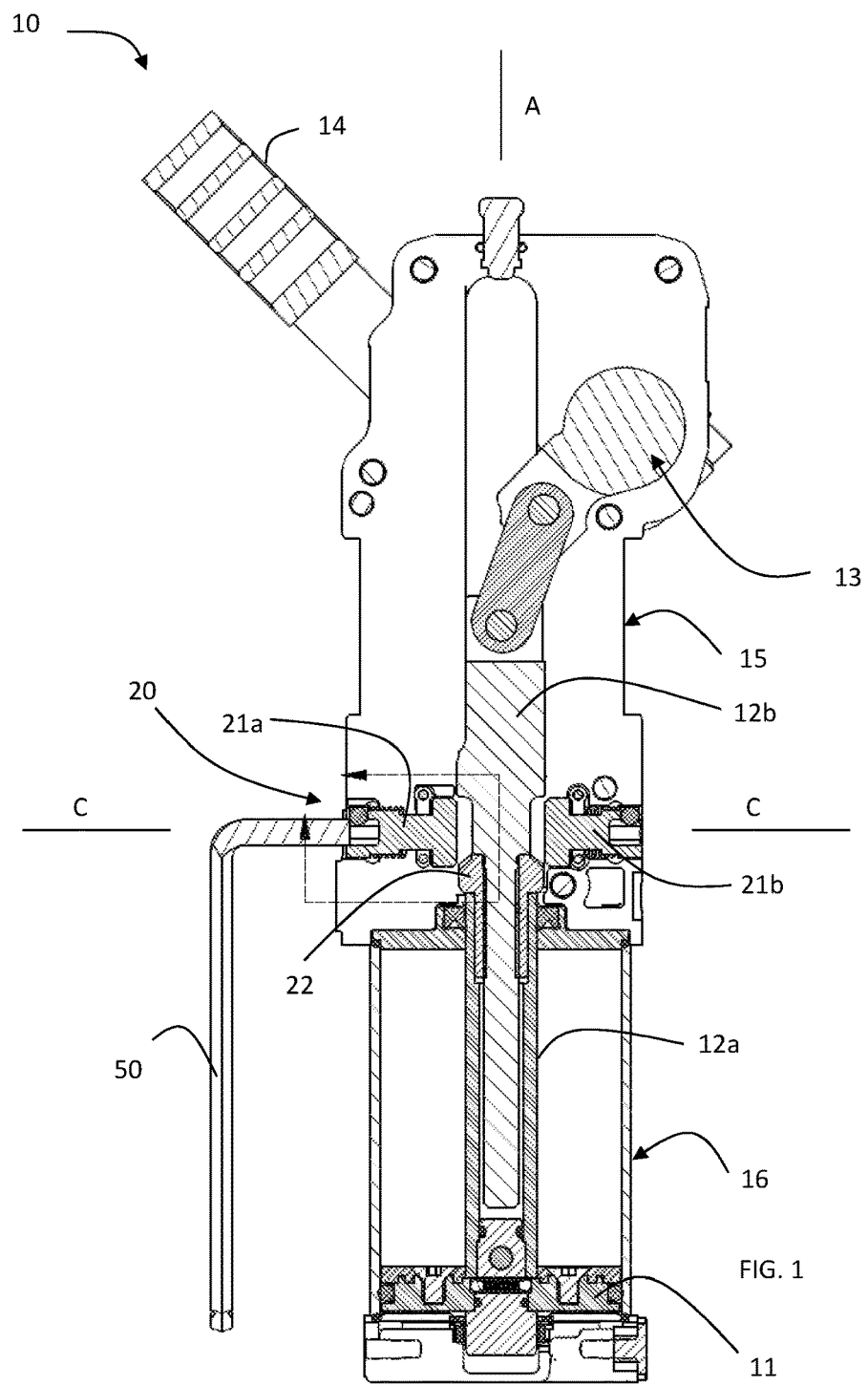
FIG. 1 is a sectional view along a first plane parallel to the piston axis of a first embodiment of the actuating device according to the present invention with a partially inserted adjusting tool and the pivotable arm in its non-operative position.
Figure 3A:
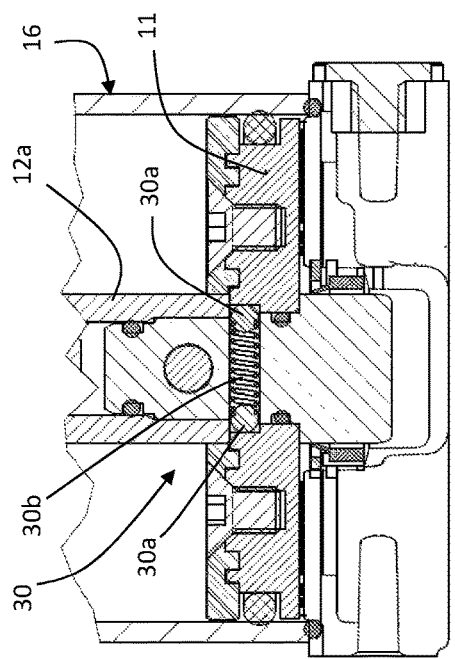
FIGS. 3a and 3b are two sectional views respectively along a first plane parallel to the piston axis and a second plane orthogonal to the piston axis showing in detail the stopping element of the actuating device of FIG. 1.
Figure 3B:
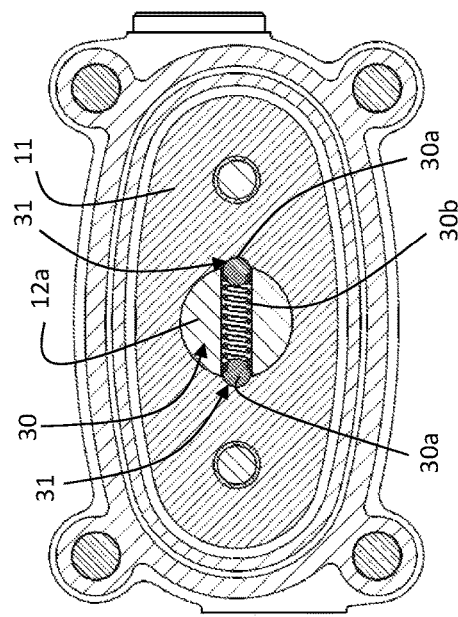

In FIG. 1 an actuating device of the articulated lever or cam type for the precise positioning of a pivotable arm according to the present invention is globally indicated with 10.

The device 10 advantageously comprises a device body 15 and a sliding control piston 11 connected to the body 15. The sliding control piston 11 is coupled to actuating means 12a,12b which slide inside the body 15 and are connected to a mechanism 13 housed inside the body 15. The mechanism 13 induces a rotation of a pivotable arm 14 about a first rotational axis B upon sliding of the piston actuating means 12a,12b along a piston axis A, wherein the first rotational axis B (see FIG. 5a or 6a) is perpendicular to the piston axis A.

In the depicted non limitative example, the mechanism 13 is an articulated lever, however the present invention is also applicable to actuating devices 10 comprising a cam mechanism or other types of mechanisms adapted for inducing a rotation of a pivotable arm 14 upon sliding of the piston actuating means 12a,12b.

In detail, the articulated lever mechanism 13 is a toggle lever which advantageously assures that in absence of a reversing force, the movement of the pivotable arm cannot be reversed, once the operative position corresponding to the over toggle point of the articulated lever mechanism has been reached.

The actuating means comprise a first 12a and a second 12b part displaceable with respect to one another along the piston axis A. In detail, the first part of the actuating means is a piston rod 12a and the second part of the actuating means is a fork linkage 12b. The piston rod 12a is coupled to the fork linkage 12b by means of a threaded coupling, so that a rotation of the piston rod 12a determines a relative displacement of the two parts 12a,12b along the piston axis A, particularly a displacement of the fork linkage 12b.

The device 10 advantageously comprises adjusting means 20 for the adjustment of the length of the actuating means 12a,12b which are accessible from a lateral side of the actuating device 10.

The adjusting means 20 comprise mechanical coupling means 21a,21b,22 which act on the piston rod 12a in order to transform a rotary control movement imparted on the coupling means 21a,21b about a second rotary axis C transversal to the piston axis A into a relative displacement between the piston rod 12a and the fork linkage 12b along the piston axis A. This relative displacement causes a change in the overall length of the actuating means 12a,12b and therefore in the piston stroke. Accordingly, the end-of-stroke position relating to the non-operative position of the pivotable arm 14 is modified, thereby achieving a stepless setting of the said non-operative position.

In the depicted non limitative example, the coupling means 21a,21b,22 comprise two rotary toothed elements 21a,21b adapted to rotate about the second rotary axis C, which can be brought into engagement on a second rotary toothed element 22 which is coaxially constrained to the piston rod 12a. When at least one of the two first rotary elements 21a,21b is engaged on the second rotary element 22, a rotation of the engaged first rotary element 21a,21b about the second rotary axis C causes a rotation of the second rotary element 22 about the piston axis A. This causes a rotation of the piston rod 12a and consequently a displacement of the fork linkage 12b so that the overall length of the piston actuating means 12a,12b is changed.

However, the present invention is also applicable to alternative mechanical coupling means like e.g. rotary elements which couple by friction or an endless screw coupled to a threaded piston rod.

Figure 2A:
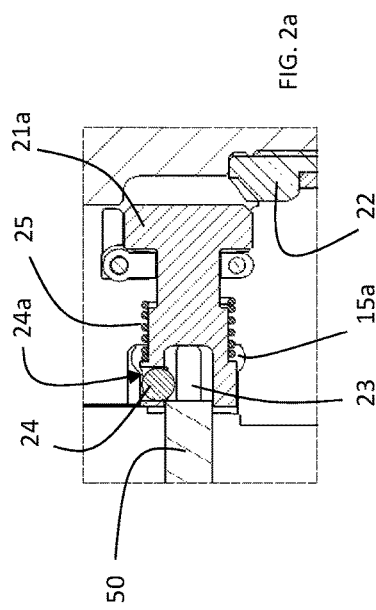
FIGS. 2a and 2b are an enlarged views of the adjustment means of the actuating device of FIG. 1 in a first and second configuration with the adjusting tool disengaged and engaged, respectively.
Figure 2B:
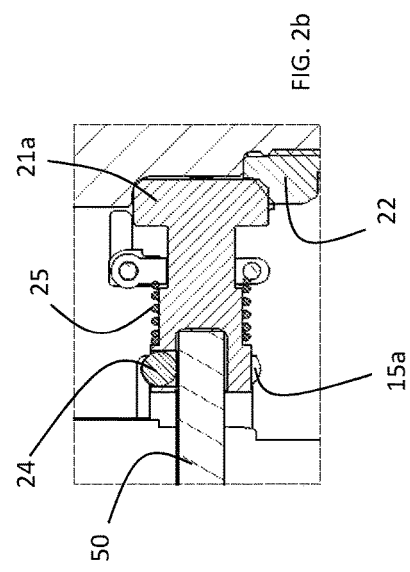
Figure 4:
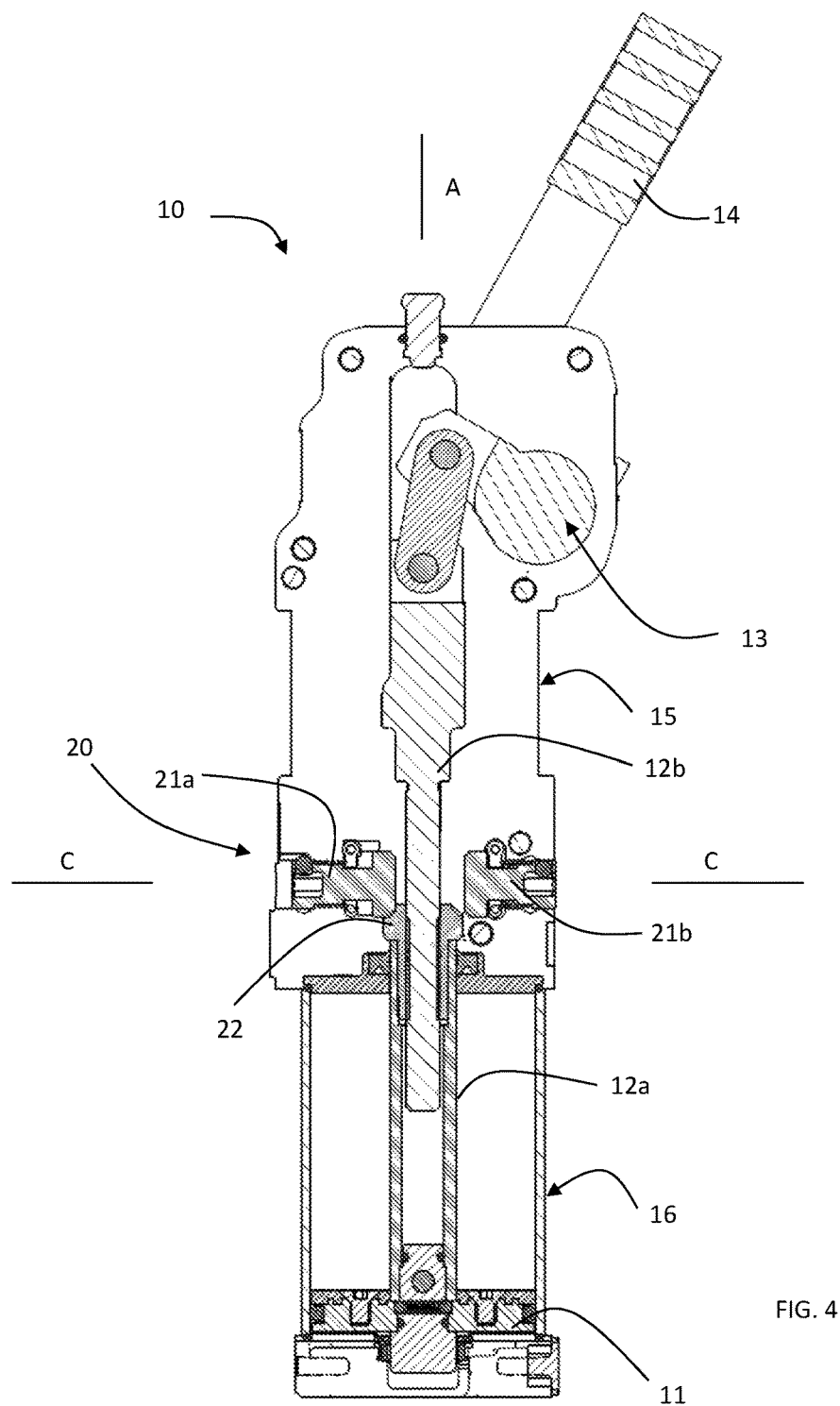
FIG. 4 is a sectional view along a first plane parallel to the piston axis of the actuating device of FIG. 1, with the non-operative position of the pivotable arm having been differently adjusted with respect to the configuration of FIG. 1 and the pivotable arm in the non-operative position.

The first rotary elements 21a,21b of the mechanical coupling means define a seat 23 for the insertion of an adjusting tool 50, which is better shown in FIGS. 2a and 2b.

The first rotary elements 21a,21b also comprise each a blocking element 24 which in the depicted embodiment is a spherical element. The spherical element 24 is retained into a respective hole 24a which is open at two opposite ends. A first end of the through hole 24a opens out into the adjustment tool seat 23 and a second end of the trough hole 24a opens out towards the device body 15 and particularly towards an annular seat 15a obtained in the body 15 substantially at the tool seat 23 of the first rotary elements 21a,21b.

In the engaged configuration (FIG. 2b), namely when the adjusting tool 50 is inserted into the related seat 23 and pushes the first rotary elements 21a,21b towards the second rotary element 22, the adjusting tool 50 urges the spherical element 24 into the annular seat 15a of the body 15, thereby maintaining the first rotary elements 21a,21b engaged with the second rotary element 22.

Furthermore, in the engaged configuration, the spherical element 24 also interferes with the adjusting tool 50 thereby retaining the adjustment tool 50 into its seat 23 and avoiding an accidental fall of the same 50.

The first rotary elements 21a,21b also comprise first elastic means 25 adapted to urge the at least one first rotary element 21a,21b into its disengaged position. In the depicted non limitative example, the first elastic means 25 is a spring wound around the first rotary elements 21a,21b and urging against the device body 15, so that the spring is compressed when the adjusting tool 50 pushes the first rotary element 21a,21b towards the second rotary element 22.

The piston rod 12a bears at least one stopping element 30 which cooperates with corresponding second seats 31 obtained in the piston 11 in order to substantially maintain the angular position of the piston rod 12a against a rotation about the piston axis A.

In the depicted non limitative example, the stopping element 30 comprises a couple of second spherical elements 30a cooperating with second elastic means 30b forcing the second spherical elements 30a into the corresponding seats 31.

In the non limitative example of FIG. 1, the actuating device 10 is a clamping unit or power clamp and the piston 11 is pneumatically actuated by means of a double effect cylinder 16. However, the present invention is also applicable to pivoting units also known as power pivots.

In the alternative example depicted in FIGS. 5a and 5b, the clamping unit 10 is actuated by means of an electrical actuator 17.

According to a further embodiment of the invention shown in FIGS. 6a and 6b, the second part 12b of the piston actuating means 12a,12b is connected to a lever 18 for manually operating the articulated lever mechanism 13.

The invention claimed is:

1. An actuating device (10) of the articulated lever or cam type comprising a body (15) coupled to a sliding control piston (11), the piston (11) being connected to or coupled to actuating means (12a, 12b) movable along a first piston axis (A) and operatively coupled to a pivotable arm (14) through interposition of an articulated lever or a cam mechanism (13) in order to induce a pivoting movement of the pivotable arm (14) about a first rotational axis (B) perpendicular to the piston axis (A) upon a sliding movement of the actuating means (12a,12b) along the piston axis (A), the pivotable arm (14) being movable between a non-operative angular position and an operative angular position, the actuating means (12a,12b) comprising a first part (12a) and a second part (12b) displaceable with respect to one another along the piston axis (A), and adjusting means (20) for the adjustment of the length of the actuating means (12a,12b), characterized in that the adjusting means (20) comprise mechanical coupling means (21a,21b,22) acting on the first part (12a) of the actuating means in order to transform a rotary control movement imparted on said mechanical coupling means (21a,21b,22) about a second rotary axis (C) transverse to the piston axis (A), into a relative displacement between the first (12a) and the second (12b) part of the actuating means (12a,12b) along the piston axis (A), thereby modifying the length of the actuating means (12a,12b).

2. The actuating device (10) of the articulated lever or cam type according to claim 1, wherein the second rotary axis (C) is perpendicular to the piston axis (A).

3. The actuating device (10) of the articulated lever or cam type according to claim 1, wherein the mechanical coupling means (21a,21b,22) comprise at least one first rotary element (21a,21b) adapted to rotate about the second rotary axis (C), which can be brought into engagement on a second rotary element (22) coaxially constrained to the first part (12a) of the actuating means (12a,12b), the rotation of the at least one first rotary element (21a,21b) about the second rotary axis (C) when engaged on the second rotary element (22) causing a rotation of the second rotary element (22) about the piston axis (A).

4. The actuating device (10) of the articulated lever or cam type according to claim 3, wherein the at least one first rotary element (21a,21b) and the second rotary element (22) are toothed elements, preferably toothed crowns or cones.

5. The actuating device (10) of the articulated lever or cam type according to claim 3, wherein the at least one first rotary element (21a,21b) and the second rotary element (22) are adapted to couple between each other by friction.

6. The actuating device (10) of the articulated lever or cam type according to claim 3, wherein the at least one first rotary element (21a,21b) comprises a seat (23) for receiving an adjustment tool (50) and a blocking element (24) which cooperates with a first seat (15a) disposed in the device body (15) and with the adjustment tool seat (23) in order to hold the first rotary element (21a,21b) into an engagement position with the second rotary element (22), when the adjustment tool (50) is inserted into the adjustment tool seat (23) and to retain the adjustment tool (50) into the adjustment tool seat (23).

7. The actuating device (10) of the articulated lever or cam type according to claim 6, wherein the blocking element is a first spherical element (24) retained into a hole (24a) disposed in the at least one first rotary element (21a,21b) which, at a first end, opens out into the adjustment tool seat (23).

8. The actuating device (10) of the articulated lever or cam type according to claim 3, wherein the at least one first rotary element (21a,21b) is coupled to first elastic means (25) adapted to urge the at least one first rotary element (21a,21b) into a disengaged position.

9. The actuating device (10) of the articulated lever or cam type according to claim 1, wherein the mechanical coupling means comprise an endless screw coupled to the first part (12a) of the actuating means (12a,12b) so that a rotation of the endless screw determines a displacement of the first part (12a) of the actuating means (12a,12b) with respect to the second part (12b) of the actuating means (12a,12b), wherein the axis of the endless screw is the second rotary axis (C).

10. The actuating device (10) of the articulated lever or cam type according to claim 1, wherein the first and second parts (12a,12b) of the actuating means comprise a piston rod (12a) and a linking element (12b) slidably coupled to each other, the linking element (12b) being connected to the articulated lever or a cam mechanism (13).

11. The actuating device (10) of the articulated lever or cam type according to claim 10, wherein the piston rod (12a) and the linking element (12b) comprise reciprocally coupled threaded surfaces and the rotary control movement imparted on said coupling means (21a,21b,22) about the second rotary axis (C) is transformed into a relative rotation between the piston rod (12a) and the linking element (12b).

12. The actuating device (10) of the articulated lever or cam type according to claim 10, wherein the linking element (12b) is a fork linkage.

13. The actuating device (10) of the articulated lever or cam type according to claim 10, wherein the piston rod (12a)

comprises at least one stopping element (30) which cooperates with a corresponding second seat (31) disposed in the piston (11) in order to substantially maintain the angular position of the piston rod (12*a*) against a rotation about the piston axis (A).

14. The actuating device (10) of the articulated lever or cam type according to claim 13, wherein the at least one stopping element (30) comprises at least a second spherical element (30*a*) cooperating with second elastic means (30*b*) forcing the second spherical element (30*a*) into said corresponding second seat (31) disposed in the piston (11).

15. The actuating device (10) of the articulated lever or cam type according to claim 1, wherein the actuating device (10) is a power clamp or a power pivot.

* * * * *